(12) United States Patent
Aiello et al.

(10) Patent No.: US 6,275,544 B1
(45) Date of Patent: Aug. 14, 2001

(54) BASEBAND RECEIVER APPARATUS AND METHOD

(75) Inventors: Roberto Aiello; Carlton J. Sparrell, both of Palo Alto, CA (US)

(73) Assignee: Fantasma Network, Inc., Mountain View, CA (US)

( * ) Notice: Subject to any disclaimer, the term of this patent is extended or adjusted under 35 U.S.C. 154(b) by 0 days.

(21) Appl. No.: 09/433,520

(22) Filed: Nov. 3, 1999

(51) Int. Cl.[7] .................................................. H04L 27/16
(52) U.S. Cl. ............................ 375/326; 375/226; 375/371
(58) Field of Search ..................................... 375/316, 320, 375/324, 326, 226, 340, 354, 368, 371; 329/312, 313, 314, 311, 365, 366, 367, 370; 327/69, 76

(56) References Cited

U.S. PATENT DOCUMENTS

| | | | |
|---|---|---|---|
| 4,201,892 | | 5/1980 | Schmidt ................................. 370/104 |
| 4,586,177 | | 4/1986 | Kaul ..................................... 370/104 |
| 5,687,200 | * | 11/1997 | Berger ................................... 375/363 |
| 5,850,422 | * | 12/1998 | Chen ..................................... 375/371 |
| 5,901,172 | | 5/1999 | Fontana et al. ....................... 375/200 |
| 5,903,605 | * | 5/1999 | Crittenden ........................... 375/226 |
| 5,940,435 | * | 8/1999 | Hendrickson ........................ 375/206 |
| 5,977,822 | * | 11/1999 | Rybicki et al. ....................... 329/313 |
| 6,094,464 | * | 7/2000 | Ebringer et al. ..................... 375/342 |
| 6,097,766 | * | 8/2000 | Okubo et al. ......................... 375/324 |

* cited by examiner

*Primary Examiner*—Chi Pham
*Assistant Examiner*—Emmanuel Bayard
(74) *Attorney, Agent, or Firm*—Sierra Patent Group, Ltd.

(57) ABSTRACT

A base band receiver apparatus comprising an RF front end section, a pulse detection unit wherein modulated, ultra-short spread spectrum pulses are detected, and a data recovery unit wherein clock and data recovery from the detected pulses are carried out. The RF front end includes an antenna and circuitry for filtering and amplifying RF signals received by the antenna. The pulse detection unit preferably includes a tunnel diode or Schottky diode which rectifies the incoming voltage signals from the RF front end and provides a power envelope, a high pass filter which removes residual DC offset from the voltage signals, and a comparator which provides threshold voltage detection. The data unit includes a clock recovery function for generating master clock timing information from the detected pulse stream, a phase offset detector for determining delays associated with pulsed data transmission from other non-master networked devices, and a data recovery function for determining digital values for incoming signals according to timing information from the clock recovery function and phase offset information from the phase offset detector.

70 Claims, 6 Drawing Sheets

BASEBAND RECEIVER APPARATUS AND METHOD

BACKGROUND OF THE INVENTION

1. Field of the Invention

This disclosure pertains generally to devices and methods for recovering RF signals. More particularly, there is disclosed herein a base band spread spectrum receiver apparatus and method for use with wireless networked transceiver node devices for isochronous data communication.

2. Description of the Background Art

Wireless communication increasingly relies on transmission of data in digital formats. Typically, a data stream is modulated onto a carrier frequency, and the modulated carrier signal is transmitted over a communications channel to a receiver or receivers. Modulation techniques generally utilize phase information of the carrier frequency. Receivers for such transmission generally include a "front end" for filtering and amplifying the carrier signal, one or more mixer circuits for converting the carrier frequency to an intermediate frequency or IF, one or more IF stages where most of the receiver gain and selectivity takes place, and detection or demodulation circuitry for recovering information from the signal. Where data is received in a synchronous digital format, a clocking system such as a phase lock loop circuit is also included with the receiver.

Wireless network systems have been implemented using such receivers. These systems generally utilize some form of continuous wave communication typically based on frequency hopping spread spectrum. The use such of conventional narrow band modulated carriers for wireless network communication has some important disadvantages. Particularly, in multipath environments such as inside rooms and buildings, data communication degrades because of multipath propagation or fading and can result in poor signal reception. Further, the rapidly increasing use of wireless consumer products has "crowded the airwaves" and will result in increasing interference with reception of data via modulated narrow band carriers. Still further, rely on use of relatively expensive components such as high-Q filters, precise local high-frequency oscillators, and power amplifiers.

One approach to avoiding the aforementioned problems would be through use of base band spread spectrum communication systems for data communication. In such a system, information may be transmitted in short pulses, modulated by relatively simple keying techniques, with power spread across a relatively large frequency band. With the signal spectrum spread across a large band width, frequency selective fading and other disadvantages of narrow band communication can be avoided. Base band technology has previously been used effectively in radar applications, wherein a single short impulse is directed to a target. The short impulse, spread across a large bandwidth, has significantly reduced spectral power density and thus has reduced probability of detection and interference. The transmission of digital data in the form of short pulses over a spread spectrum would avoid the aforementioned problems associated with narrow band data communication. Suitable, cost-effective receiver architectures for receiving such data transmissions, however, have heretofore been unavailable.

Accordingly, there is a need for a base band spread spectrum receiver system and method which can receive data in the form of short, spread spectrum pulses, which can be used with a network of transceiver node devices, which is not susceptible to multipath fading or interference with narrow band communication systems, which can be used for indoor applications, and which is relatively simple and inexpensive to implement. The present invention satisfies these needs, as well as others, and generally overcomes the deficiencies found in the background art.

An object of the invention is to provide a base band receiver apparatus and method which efficiently receives data in the form of ultra-short, spread spectrum pulses.

Another object of the invention is to provide a base band receiver apparatus and method which is not susceptible to multipath fading or interference from narrow band communication devices.

Another object of the invention is to provide a base band receiver apparatus and method which converts RF pulses directly to data without intermediate frequency staging.

Another object of the invention is to provide a base band receiver apparatus and method which is simple and inexpensive to implement.

Another object of the invention is to provide a base band receiver apparatus and method for use in a wireless network comprising multiple transceiver node devices.

Another object of the invention is to provide a base band receiver apparatus and method which allows synchronization to a master clock of a remote master transceiver device in a multiple transceiver device network.

Another object of the invention is to provide a base band receiver apparatus and method which allows determination of phase offset corrections, based on timing information recovered from a master clock, for processing signals received from non-master transceiver devices.

Another object of the invention is to provide a base band receiver system and method which can be used for indoor applications.

Further objects and advantages of the invention will be brought out in the following portions of the specification, wherein the detailed description is for the purpose of fully disclosing the preferred embodiment of the invention without placing limitations thereon.

SUMMARY OF THE INVENTION

Disclosed herein is a base band receiver system and method that receives and demodulates data transmitted, without a carrier frequency, as series of ultra-short, spread spectrum modulated electromagnetic pulses. The electromagnetic pulses each comprise a digital signal representative of a transmitted value. The receiver system advantageously converts the ultra-short, spread spectrum pulses directly to data without going through intermediate frequency (IF) staging. The elimination of IF staging allows reduced cost and easier fabrication of the receiver as a single chip device.

The receiver apparatus and method is generally utilized in connection with a network of transceiver node devices, one of which acts as a "master" transceiver. The other transceivers are structured and configured as "slave" transceiver devices, each of which includes a receiver apparatus in accordance with the present invention. Data is transmitted in the form of short base band spread spectrum radio frequency (RF) pulses. The master transceiver maintains a master clock which runs at a multiple of the data transmission bit rate. The slave transceivers have local clocks which also run at a multiple of the data transmission bit rate, and which are synchronized to the master clock. The master transceiver manages data transmissions between the slave node devices of the networked system.

Data transmission between the several transceiver node devices is preferably carried out via a Medium Access Control protocol utilizing a Time Division Multiple Access (TDMA) frame definition. Under the TDMA architecture, the data transmitted as short RF pulses is divided into discrete data "frames", with the data frames being further subdivided into "slots". Framing control by the master transceiver device generates and maintains time frame information through use of "Start-Of-Frame" (SOF) symbols, which are used by the slave transceivers to identify the frames in the incoming data stream.

The TDMA frame definition preferably comprises a master slot, a command slot, and a plurality of data slots. At least once per frame, the master transceiver generates a Master Sync Code which is used by the receiver apparatus in the slave transceivers for clock recovery. The Master Sync Code is preferably in the form of a unique bit pattern, located at the beginning or leading edge of the master slot, which identifies the master transceiver as the source of the transmission. The command slot is used for sending, requesting and authorizing commands between the networked master and slave transceiver devices. The master transceiver uses the command slots for ascertaining which slave devices are online, offline, or engaged in data transfer, and for authorizing data transmission requests from the slave devices. The slave transceiver devices use the command slots for requesting data transmission and indicating its startup (online) or shutdown (offline) states. The data slots are used for data transmission between the transceiver node devices of the network. The data slots each include Data Header Codes in the form of unique bit patterns which identify specific slave transceiver devices. Each slave transceiver device of the network is assigned one or more corresponding data slots within the frame in which the slave device may transmit data directly to another slave device without the need for a "store and forward" scheme as is presently used in the prior art. The master transceiver may dynamically assign one or more data slots to slave devices which request to transmit data. Preferably, the data slots are structured and configured to have variable bit lengths having a granularity of one bit.

In its most general terms, the receiver apparatus comprises an RF front end section, a pulse detection unit wherein modulated, ultra-short spread spectrum pulses are detected, and a data recovery unit wherein clock and data recovery from the detected pulses are carried out. The invention may be embodied in various hardware or circuitry configurations, and is preferably embodied in a single IC device.

The RF front end of the receiver apparatus generally comprises an antenna together with means for filtering and amplifying RF signals received by the antenna. The antenna at the RF front end is preferably a ground plane antenna having an edge with a notch or cutout portion operating at a broad spectrum frequency ranging from about 2.5 gigahertz (GHz) to about 5 GHz, with the center frequency at about 3.75 GHz. An RF switch, which may be a conventional antenna switching circuit, is preferably included in association with the antenna to allow the antenna to be shared with a transmitter, so that the receiver system of the invention may be implemented together with a transmitter in a transceiver device. The filtering and amplification means preferably comprises one or more band pass filters and one or more low noise, variable gain amplifiers. The type, number and configuration of filters and amplifiers used in the front end may vary as required for particular applications of the invention. The RF front end converts the received RF pulses into corresponding voltage signals from which pulse information is detected. Gain control in the form of an automatic gain control loop (AGCL) may also be included with the RF front end.

The pulse detection unit is preferably an envelope detection circuit, and preferably comprises a first amplifier, a high (GHz range) operating frequency detector diode, a high pass or band pass filter, a second amplifier, and a comparator. The detector diode is preferably tunnel diode or Schottky diode which provides envelope detecting means, rectifies the incoming voltage signals from the RF front end, and provides a power envelope. The filter removes any long term DC or noise components from the signals. The comparator provides threshold detection means and generates pulses when the filtered, rectified voltage signals exceed a predetermined threshold voltage. The shape of the pulsed envelope of the incoming signal can be evaluated from the output of the envelope detection circuit. As in the RF front end, the particular filtering and amplification used in the envelope detection circuit may be varied as required for particular uses of the invention.

The data processing unit retrieves information from the detected pulses output by the envelope detection circuit. The data processing unit preferably comprises a clock recovery function for generating master clock timing information from the detected pulse stream, a phase offset detector for determining delays associated with pulsed data transmission from non-master networked devices, and a data recovery function for determining digital values from a detected pulse stream according to timing information from the clock recovery function and phase offset information from the phase offset detector.

The clock recovery function generally includes a mask for suppressing selected pulses. Preferably, a pulse stretcher is also included for dilating or stretching pulses to simplify processing by digital logic. A pulse sampler is included in the clock recovery unit to sample the pulses. A correlator is provided for matching incoming pulse trains to the known Master Sync Code associated with the master clocking function. A Sync Code predictor generates mask signals for suppressing pulses which are not associated with expected pulsed synchronization codes. A phase-locked loop (PLL) synchronizes a local clock in the receiver apparatus to a master clock according to detected or predicted master sync codes. The timing information thus generated is directed to the phase offset detector and data recovery function.

The phase offset detector includes a mask for suppressing selected pulses received from the envelope detector circuit. A pulse stretcher may also be included in the phase offset detector to facilitate subsequent sampling by digital logic. A data header predictor receives output from the correlator in the clock recovery function and generates mask signals according to detected or expected Data Header Codes in the pulse stream. Timing information from the PLL in the clock recovery function is directed to an offset detector. The offset detector oversamples the incoming pulse train and determines the phase offset or delay between the phase locked bit clock and the incoming pulses. The phase offset thus determined is provided to the data recovery function.

The data recovery function adds phase offset output from the offset detector and timing output from the bit clock from the PLL to determine a sampling time for each incoming pulse. An analog-to-digital converter (ADC) in the data recovery function receives the analogue output from the envelope detector and decodes it to digital values according to the determined sample timing. A decoder converts the digital values from the ADC to symbols. The symbol output is delivered to higher protocol layers of the network system.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 4:
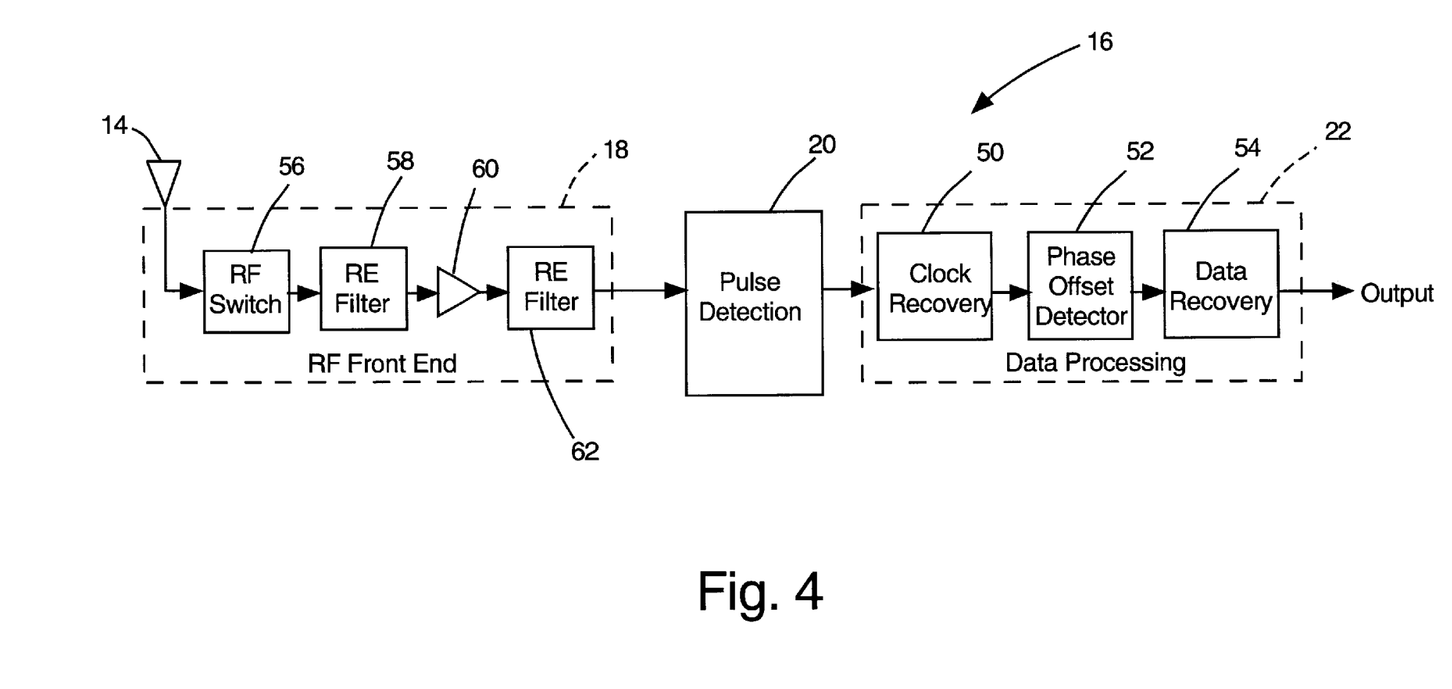
FIG. 4 is a functional block diagram of a receiver apparatus in accordance with the present invention showing the details of the RF front end.
Figure 5:
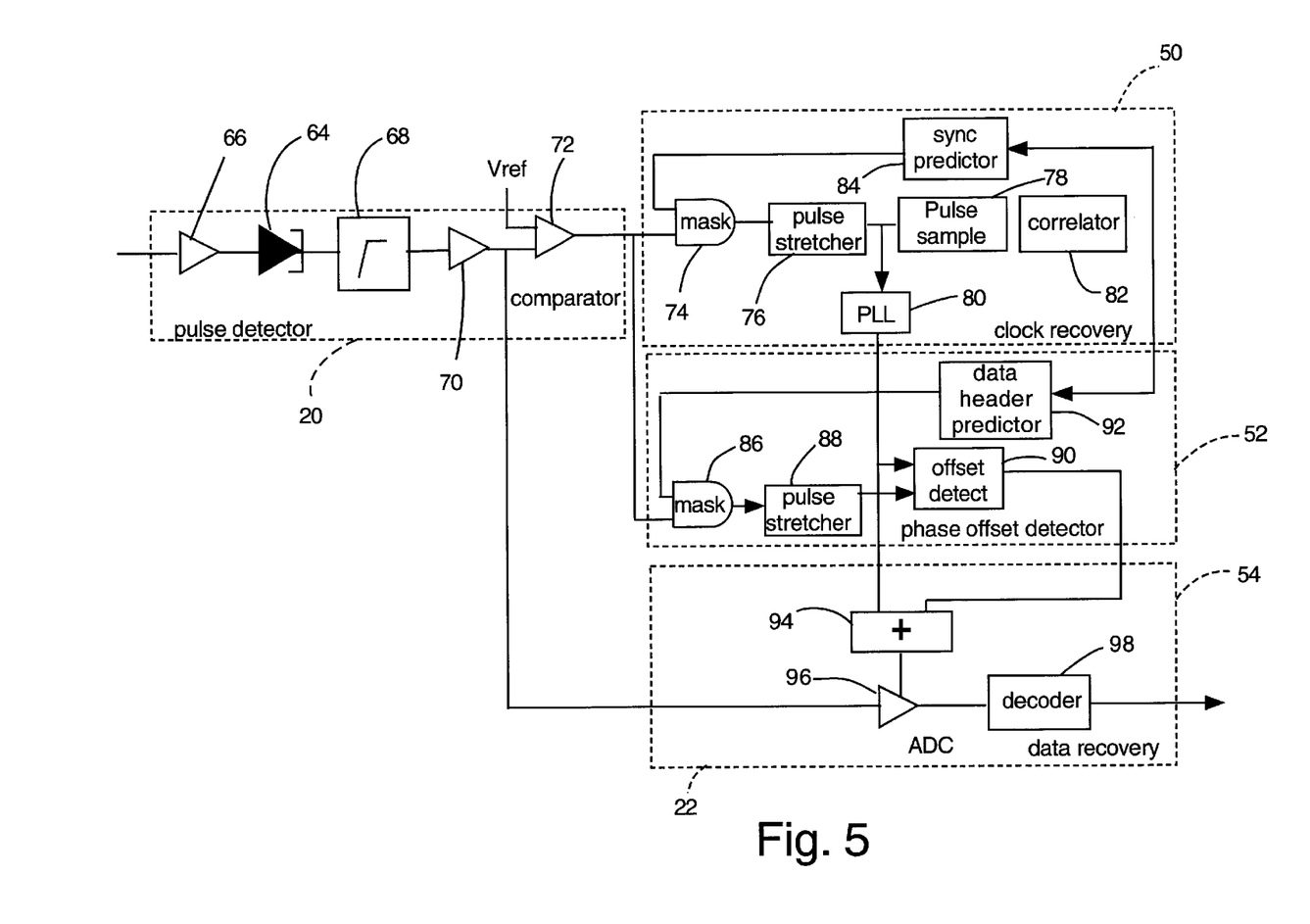
FIG. 5 is a functional block diagram of the pulse detector and data demodulation functions of the receiver apparatus of the invention.
Figure 6:
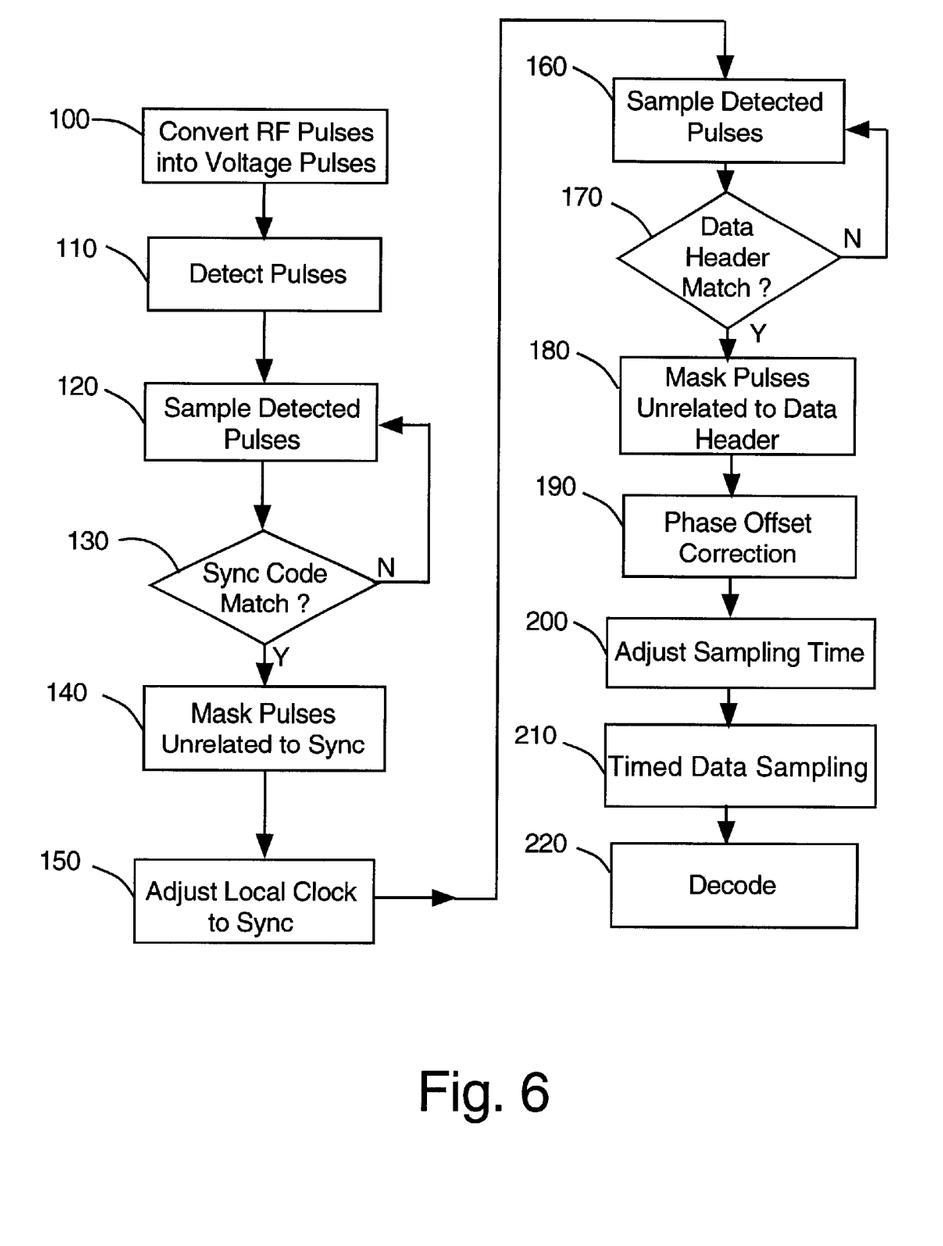
FIG. 6 is a flow chart illustrating the receiver method of the invention.

Referring more specifically to the drawings, for illustrative purposes the present invention is embodied in the apparatus shown generally in FIG. 1 through FIG. 5, and the method shown in FIG. 6. It will be appreciated that the apparatus may vary as to configuration and as to details of the parts, and that the method may vary as to details and the order of the steps, without departing from the basic concepts as disclosed herein. The invention is disclosed generally in terms of use in a wireless network of multiple transceiver devices for isochronous data communication. However, it will be readily apparent to those skilled in the art that the invention may be used in numerous types of data reception applications, and the details and specificities discloses herein are only exemplary and should not be considered limiting. It will also be readily apparent to those skilled in the art that various functional components of the invention as described herein may share the same logic and be implemented within the same circuit, or in different circuit configurations.

Figure 1:
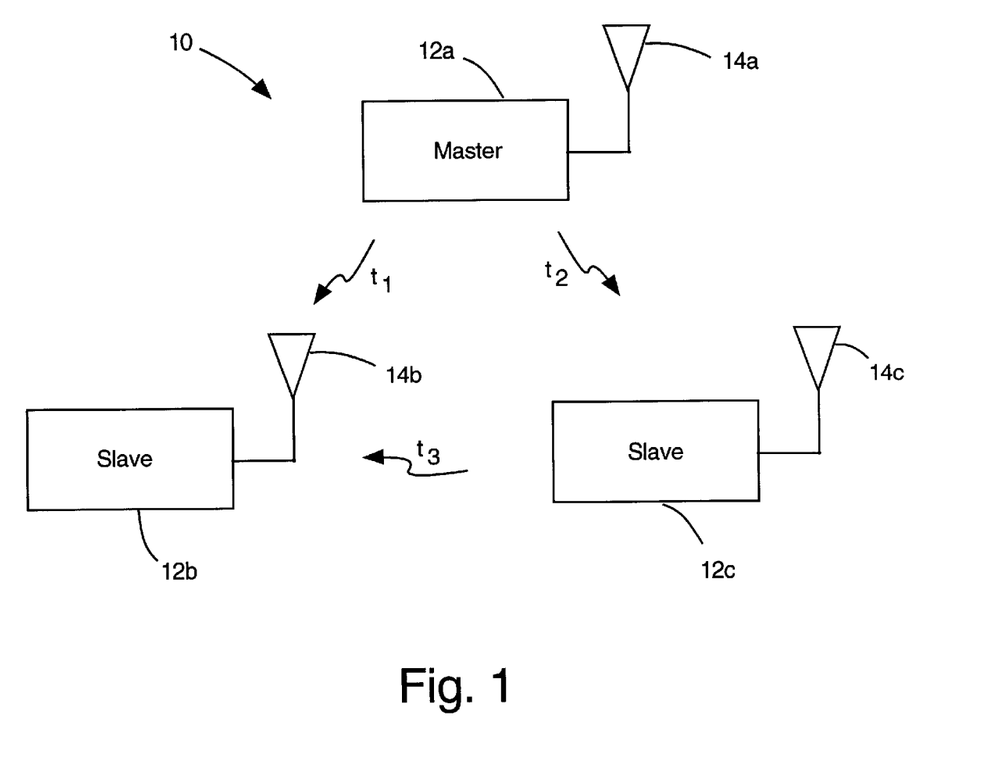
FIG. 1 is a functional block diagram of a multiple transceiver device network utilizing a receiver apparatus in accordance with the present invention.

The receiver apparatus and method of the present invention will be more fully understood by first referring to FIG. 1, which shows a wireless network system 10 comprising a plurality of mobile transceiver devices 2a–12c each having a corresponding antenna 14a–14c. One device 12a is acting as a "master" transceiver, while the remaining devices 12b, 12c act as "slave" transceivers. The particular transceiver node 12a–12c which acts as the master device may change depending upon the manner in which the network system 10 is used, and thus the components and hardware for each transceiver 12a–12c are generally the same. Only three transceiver devices 12a–12c are shown in network system 10 for reason of clarity. The network system 10 may comprise a larger number of transceiver devices, with the actual number of transceiver devices in network system 10 varying depending on the particular use of the invention.

The master transceiver 12a maintains a master clock and manages the timing of network communication between the various transceiver nodes of the network 10. In operation, each of the transceiver devices 12a–12c may transmit or receive data to each other transceiver device 12a–12c. Data transmissions arriving at a particular transceiver node 12a–12c will generally be delayed by the time-off-light of the base band pulses according to the location and environment of the transceiver nodes 12a–12c. Thus, for example, pulses transmitted from master transceiver 12a to slave transceiver node 12b will experience a propagation delay $t_1$, while pulses transmitted from master transceiver 12a to slave transceiver node 12c will experience a propagation delay of $t_2$ due the different distances and environments involved. Further, data transmission from slave transceiver node 12c to slave transceiver node 12b will experience another different propagation delay $t_3$. Since the timing of data transmissions is managed according to timing provided by the master device 12a, in order for slave transceiver node 12b to correctly receive and demodulate data transmissions from slave transceiver node 12c, timing or phase offset corrections associated with both propagation delays $t_1$ and $t_2$ must be carried out. The receiver apparatus and method of the invention advantageously provides for accurate data recovery via timing information recovered from a master transceiver and phase offset corrections for transmissions associated with other slave transceivers, as described in detail below.

Figure 2:
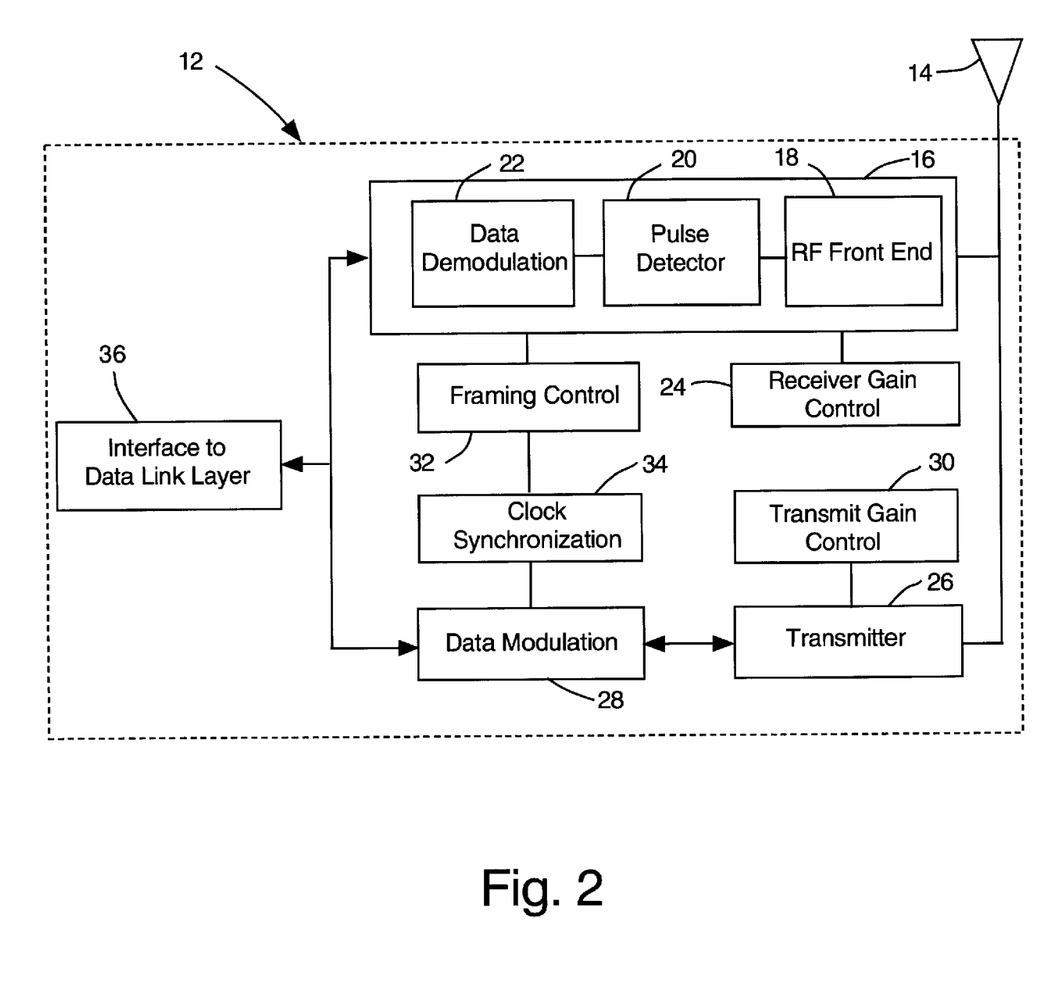
FIG. 2 is a function block diagram of a transceiver node showing a receiver apparatus in accordance with the invention.

Referring also to FIG. 2, the "Physical Layer" (PHY) aspects of transceivers 12a–12c are shown. The Physical Layer as described herein is used in accordance with the Open Systems Interconnection (OSI) Reference model. This model is based on a proposal developed by the International Standards Organization (ISO) for interconnected systems.

Each transceiver node device 12a–12c includes a receiver apparatus 16 in accordance with the invention. Receiver 16 comprises generally an RF front end section 18, a pulse detector 20, and a data demodulation or data recovery function 22, which are discussed in detail below. Receiver gain control 24 is included in association with receiver 16. Each transceiver node 12a–12c also includes a transmitter device 26 and data modulation function 28. Transmitter gain control 30 is associated with transmitter 26. A framing control 32 unit and clock synchronization unit 34 are also included with transceiver 12 in association with receiver 16 and transmitter 26. Transmitter 26 and receiver 16 are operatively coupled to antenna 14, preferably through an RF switch (not shown).

Transmitter 26 and receiver 16 are also operatively coupled to a Data Link Layer (DLL) interface 36.

Data Link Layer interface 36 comprises circuitry and/or hardware which provides an interface or higher communication exchange layer between the Physical Layer (PL) of network 10, as embodied in transceiver device 12, and the "higher" layers according to the OSI reference model. The layer immediately "above" the Physical Layer is the Data Link Layer. Output information from the Data Link Layer is directed to data modulation unit 28 via interface 36, while input data from receiver 16 and data demodulation function 22 is directed to the Data Link Layer via interface 36.

The data modulation function or unit 28 comprises circuitry and/or hardware which converts information received from interface 36 into an output stream of pulses. Various forms of pulse modulation may be employed by data modulator 28. In the simplest case comprises on-off keying wherein the presence and absence of pulses respectively represent the "ones" and "zeros" for digital information. In this situation, data modulation unit 28 causes a pulse to be generated at the appropriate bit time to represent a "one", or causes the absence of a pulse to represent a "zero". In another embodiment, pulse amplitude modulation is employed wherein the amplitude of a pulse represents a digital value. The number of bits represented by a pulse depends on the dynamic range and signal-to-noise ratio available. The pulse stream generated by data modulator 28 and transmitted by transmitter 26 is synchronized with a master clock associated with the clock synchronization function 34, and is sent in an appropriate time slot according to a frame definition provided by the framing control 32, as described further below. In order to maintain a synchronized network, one device must serve the function being a clock master and maintaining the master clock for the network 10.

Transmitter 26 is preferably a wide band transmitter device which generates a pulse stream according to output from data modulation unit 28 and which transmits the pulse stream via antenna 14 as a stream of electromagnetic radio frequency (RF) pulses. In the preferred embodiment, data is transmitted via impulses having 100 picosecond risetime and 200 picosecond width, which corresponds to a bandwidth of between about 2.5 GHz and about 5 GHz. The transmitter gain control 30 preferably comprises a conventional automatic gain control loop (AGCL) circuit.

Antenna 14 comprises a radio-frequency (RF) transducer and is structured and configured for both transmission and reception. During reception, antenna 14 converts RF pulses into corresponding voltage signals. During transmission, antenna 14 converts an electric current containing pulse information into corresponding base band spread spectrum RF pulses. In one preferred embodiment, antenna 14 is structured and configured as a ground plane antenna having an edge with a notch or cutout portion operating at a broad spectrum frequency in the range of between about 2.5 GHz and about 2 GHz, with a center frequency at about 3.72 GHz. The structure and configuration of antenna 14 may vary in order to accommodate various frequency spectrum ranges. Antenna 14 may alternatively comprise a "dual antenna" configuration wherein transmission and reception occur from different portions or regions of antenna 14.

Clock synchronization unit 34 includes a clock function (not shown) which maintains a clock or timing device (also not shown). The clock is preferably a conventional voltage controlled oscillating crystal device which operates at a multiple of the bit rate for the system 10. In the case of the master transceiver 12a, the clock in the clock synchronization unit serves as a master clock for network 10. As noted above, each transceiver node 12a–12c may act as the master device for the network. A clock recovery function, described further below, is included with receiver 16 wherein timing information from the master clock is recovered.

Framing control function 32 comprises hardware and/or circuitry which carries out the operations of generating and maintaining time frame information with respect to transmitted data. Framing control function 32 is utilized by the transceiver node which is acting as the master transceiver by dividing up the transmitted pulse information into "frames". Data transmission between the several node devices 12a–12c is preferably carried out via a Medium Access Control protocol utilizing a Time Division Multiple Access (TDMA) frame definition. Under the TDMA architecture, the data transmitted as short RF pulses is divided into discrete data frames, with the data frames being further subdivided into "slots". The frame definition is provided to transceivers 12a–12c from the Data Link Layer via interface 36. The TDMA frame definition is defined by Medium Access Control (MAC) sublayer software associated with the Data Link Layer. Framing control function 32 in master transceiver device 12a generates and maintains time frame information through use of "Start-Of-Frame" (SOF) symbols, which are used by the slave transceivers 12b, 12c to identify the frames in the incoming data stream.

Figure 3:
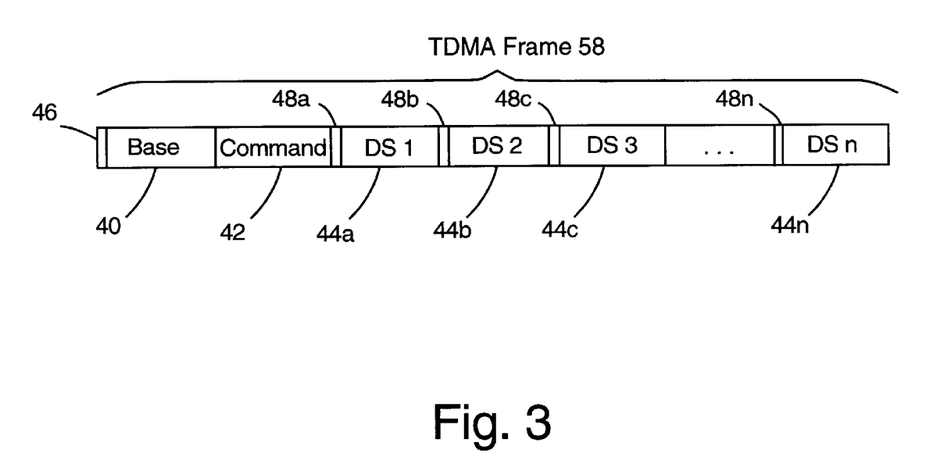
FIG. 3 is a schematic representation of a data frame as used in data transmission and reception in accordance with the present invention.

Referring also to FIG. 3, there is shown a TDMA frame definition 38 as utilized in the receiver apparatus and method of the invention. Data transmission in the network 10 is carried out as a series of frames 38. The TDMA frame definition 38 preferably comprises a master slot 40, a command slot 42, and a plurality of data slots 44a–44n. The master slot 40 includes a Master Sync Code 46 which is used by the receiver apparatus of the invention for clock recovery. The Master Sync Code is generated by the master transceiver 12a at least once per frame 38. Master Sync Code 46 preferably comprises a unique bit pattern, located at the beginning or leading edge of the master slot 40, which identifies the master transceiver 12a as the source of the transmission for that part of frame 38, and which represents timing information associated with the master clock in the clock synchronization unit 34 of the master transceiver 12a. The Master Sync Code 46 is also at the leading edge of the entire frame definition 38, and also serves as a Start-Of-Frame (SOF) symbol. The Master Sync Code 46, in one embodiment, utilizes a 10-bit SOF code comprising "0111111110". The use of a TDMA frame definition is only exemplary, and other frame definitions may be used.

Various encoding schemes known in the art may be used to guarantee that the SOF or Master Sync Code 46 will not appear anywhere else in the data sequence of the frame 38. For example, a common encoding scheme is 4B/5B encoding, where a 4-bit values is encoded as a 5-bit value. Several criteria or "rules" specified in a 4B/5B code table, such as "each encoded 5-bit value may contain no more than three ones or three zeros" and "each encoded 5-bit value may not end with three ones or three zeros", ensure that a pulse stream will not have a string of six or more ones or zeros. Other encoding techniques known in the art may also be used for Master Sync Code 46, including, for example, bit stuffing or zero stuffing.

The command slot 42 contains protocol messages exchanged between the transceiver devices 12a–12c of network 10, which are used by the master transceiver for managing network communication. The flow of protocol messages in the command slot 42 may be governed, for example, by a sequence retransmission request or "SRQ" protocol scheme wherein confirmation of protocol transactions are provided following completion of an entire protocol sequence.

The data slots 44a–44n comprise non-protocol data. Each of the data slots 44a–44n provides a data transmission time for a corresponding slave transceiver in network 10, and a data header code 48a–48n is associated with the leading edge of each data slot 44a–44n. Each data slot 44a–44n is preferably structured and configured to have a variable bit width which may be dynamically assigned by the master transceiver. Alternatively, each slave transceiver may transmit requests for the use of one or more of data slots 44a–44n. Thus, each frame 38 may contain more data slots 44a–44n than the number of transceiver devices in the network, with multiple data slots being assigned to a particular transceiver node. The data header code 48a–48n identifies the transceiver node device 12a–12c associated with each data slot 44a–44n.

With the above-described features of network system 10 in mind, reference is now made to FIG. 4 and FIG. 5, wherein the details of receiver apparatus 16 are illustrated. As noted above, receiver 16 comprises an RF front end section 18, a pulse detector 20 operatively coupled to or associated with front end section 18, and a data demodulation or processing function 22 which is operatively coupled to or associated with pulse detector 20. The data processing function further comprises a clock recovery function 50, a phase offset detector 52, and a data recovery function 54. FIG. 4 shows the details associated with RF front end section 18, while FIG. 5 shows the details of pulse detector 20 and data processing function 22. Receiver 16 may be embodied in various hardware or circuitry configurations, and is preferably embodied in a single IC device.

Front end section 18 converts RF pulse signals into "received" pulses in the form of filtered, amplified voltage pulse signals. Front end section 18 preferably comprises an RF switch 56 operatively coupled to antenna 14, a first frequency selective RF filter 58 operatively coupled to RF switch 56, at least one amplifier 60 operatively coupled to RF filter 58, and a second frequency selective filter 62 operatively coupled to amplifier 54. RF switch 56 is preferably a conventional antenna switching circuit which allows antenna 14 to be shared between the receiver 16 and a transmitter 26 of a transceiver device 12a–12c. Filters 58, 62 preferably comprise conventional high pass or band pass LC circuit filters. Amplifier 60 is preferably a wide band, low noise, variable gain amplifier device.

The number and type of RF filters and amplifiers employed in BF front end section 18 may vary depending upon the particular application of the invention. For example, a single RF filter 58 or 62 could be used alone and either positioned before or after amplifier 60. Since receiver 16 is not a narrow band device, it is possible to omit filters 58, 62 from front end 18 to minimize cost, although the omission of filters 58, 62 would result in a reduction in the overall performance of front end 18. Receiver gain control 24 (FIG. 2) is preferably operatively coupled to amplifier 60 of front end 18. Receiver gain control 24 preferably comprises a conventional automatic gain control loop or AGCL circuit to prevent degradation of the signal-to-distortion level.

Antenna 14 is preferably a ground plane antenna having an edge with a notch operating at a broad spectrum frequency in the 2.5 to 5 GHz range, as noted above. Antenna 14 may alternatively comprise other types of base band spread spectrum antenna, including TEM "horns", waveguide horns, log-conical spirals, cavity-backed spirals, or log-periodic dipole arrays. Antenna 14 may additionally have a "dual antenna" configuration wherein transmission and reception occur at different portions or sections of antenna 14. The use of such a dual antenna allows removal of RF switch 56 and provides a corresponding reduction in losses which are associated with RF switch 56. A dual antenna also allows variation of the impedance of the transmitter portion of the antenna without effecting the impedance of the receiver portion.

Pulse detector 20 recovers a stream of detected pulses from the voltage signals provided by RF front end 18. Pulse detector 20 preferably comprises an envelope detector, and more preferably comprises a detector diode-based envelope detector circuit. In this regard, pulse detector 20 includes a detector diode 64 which is operatively coupled to a first amplifier 66 and a frequency selective filter 68. The term "detector diode" as used herein is intended to encompass tunnel diodes, Schottky diodes or any other suitable high speed detector diode. Amplifier 66 is preferably a low noise, variable gain amplifier , and is operatively coupled to RF filter 62 of front end section 18. A second low noise, variable gain amplifier 70 is operatively coupled to filter 68, and a comparator 72 is operatively coupled to amplifier 70 and to a reference voltage source $V_{ref}$. Additional gain control in the form of an AGCL circuit (not shown) may be used in association with amplifier 66 or 70.

The voltage signals output from front end 18 are input to pulse detector 20, where they are amplified by amplifier 66 and directed to detector diode 64. Diode 64 is serially interfaced to amplifier 66 and high pass filter 68, with the anode end of diode 64 operatively coupled to amplifier 66 and RF front end 18, and with the cathode end of tunnel diode 64 operatively coupled to high pass filter 68. Diode 64 rectifies the voltage signal from front end section 18 to provide a stream of DC voltage peaks. High pass filter 68, which may comprise an LC filter circuit, is structured and configured to remove residual DC noise from the voltage pulse stream. An additional low pass filter (not shown) may be used in association with high pass filter 68 to filter out other noise components. The rectified pulse stream is amplified by amplifier 70. Comparator 72 acts as a threshold detector and compares each DC voltage peak in the pulse stream to the reference voltage and removes DC voltage peaks which fall below the reference voltage to provide a stream of detected pulses as output to the data processing function 22. High pass filter 68 removes all continuous wave (CW) interference from the detector output. Any sinusoidal voltage signals would generally appear as a DC offset in the output of pulse detector 20. High pass filter 68 advantageously removes this DC offset and accordingly removes the interference.

The clock recovery function 50 of data processing function 22 provides for recovery of master clock timing information from the pulse stream output by pulse detector 20. As noted above, data transmissions within network 10 are provided in TDMA defined frames 38 each of which include a Master Sync Code 46 associated with the leading edge of each frame 38, and which is provided by the master transceiver of the network according to its internal master clock. Clock recovery function 50 identifies the Master Sync Codes 46 for incoming data frames and synchronizes the local clock of the slave transceiver device.

Clock recovery function 50 includes a pulse suppressor or mask element 74, which is operatively coupled to voltage comparator 72 in pulse detector 20. An optional pulse dilation element or "stretcher" 76 is operatively coupled to mask element 74, and a pulse sampler 78 and phase lock element (PLL) 80 are operatively coupled to pulse stretcher 76. At least one correlator 82 is operatively coupled to pulse sampler 78, and a sync predictor element 84 is operatively coupled to correlator 82 and mask element 74.

Mask element 74 comprises circuitry which selectively masks or suppresses detected pulses, according to signals from sync predictor 84, which are not associated with Master Sync Codes 46. Pulse stretcher 76, which may be omitted, comprises circuitry which lengthens pulses to facilitate pulse sampling by digital logic in pulse sampler 78 and to improve processing gain. The digital logic circuit in sampler 78 preferably utilizes a flip-flop. Correlator 82 comprises circuitry which compares and matches pulses sampled by sampler 78 to known synchronization symbols, to determine the location of the Master Sync Code 46 in the pulse stream. Sync predictor 84 comprises circuitry which generates mask signals, according to the predicted location of the Master Sync Code 46, and provides mask signals to mask element 74 to suppress pulses which are not associated with the Master Sync Code 46. Prior to matching a Master Sync Code 46 to the incoming pulse stream by correlator 82, the mask signals are negated so that all pulses are sampled by sampler 78, as related further below.

Phase lock element 80 preferably comprises a conventional phase lock loop or delayed lock loop circuit having generally (not shown) a frequency reference, a reference divider, a phase detector (PSD), and a voltage controlled oscillator (VCO), the output of which is looped back to the PSD via digital control. Phase lock element 80 generates a first clock (not shown) equal in period to the pulse repetition, and a second clock (not shown) at a frequency multiple of the first clock for use in pulse sampling. Where the sync code predictor 84 has predicted an incoming Master Sync Code 46 in the pulse stream sampled by sampler 78, PLL 80 compares the rising edge of the first bit clock to the incoming pulses of the predicted Master Sync Code 46, and adjusts or matches the phase of the first clock to the phase of the incoming pulses. The phase adjustment is carried out by first using a coarse synchronization, wherein the period of the first clock is adjusted so that its rising edge is close in phase to the incoming pulses. Following coarse synchronization, PLL 80 uses its voltage controlled oscillator or a like circuit to measure the phase difference and adjust the clock rising edge in order to "lock" the local clock to the master clock.

The clock recovery function could alternatively utilize several duplicate circuits in parallel to speed up the locking process, particularly in "noisy" environments. With the use of multiple correlators, for example, if one correlator is attempting to correlate the Master Sync Code 46 based on an invalid pulse, another correlator may commence matching the next incoming pulse, which may occur during the masking period of the first correlator.

The phase offset detector 52 of the data processing function 22 provides for determination of phase offset corrections associated with "peer-to-peer" communication between slave transceiver devices in a network. Referring again to FIG. 1, when a slave transceiver 12b receives a pulsed transmission directly from the master transceiver 12a, the incoming pulse stream can be sampled and recovered by slave transceiver 12b according to synchronization to the master clock of the master transceiver 12a via the Master Sync Code 46. The slave transceiver 12b will be synchronized to pulses as received by the clock recovery unit 50, but the pulses are received at some time $t_1>0$ due to the time of flight propagation delay between transmission by the master transceiver 12a and reception by the slave transceiver 12b. When the slave transceiver 12b transmits to the master 12a, the master transceiver 12a will receive pulsed data subject to a round trip delay of $2t_1$ according to the rising edge of its own bit clock (the master clock).

In a system 10 with multiple slave transceiver devices 12b, 12c, each slave device 12b, 12c can be synchronized to the master clock of the master transceiver 12a, but a different phase offset will be associated with the different time-of-fight propagation delays $t_1>0$, $t_2>0$, between the master transceiver 12a and slave transceivers 12b, 12c respectively. For "peer-to-peer" communication between slave devices 12b and 12c, data demodulation and recovery from the pulse stream will need to take into account the different phase offsets associated with the time-of-flight propagation delays $t_1,t_2$ between master 12a and slaves 12b, 12c, as well as the phase offset associated with the time-of-flight propagation delay $t_3$ between slave devices 12b, 12c.

Referring again to FIG. 5 with the above in mind, phase offset detector 52 includes a mask element 86 which is operatively coupled to voltage comparator 72 in pulse detector 20. An optional pulse stretcher 88 is operatively coupled to mask element 86. An offset detector circuit 90 is operatively coupled to pulse stretcher 88 and to phase lock element 80 in clock recovery unit 50. A data header predictor 92 is operatively coupled to mask element 86, to PLL 80, and to correlator 82 in clock recovery unit 50.

As noted above, each data slot 44a–44n in TDMA frame 38 includes a data header code 48a–48n at a leading edge. Mask element 86 comprises circuitry which selectively masks or suppresses detected pulses, according to signals from data header predictor 92, which are not associated with data header codes 48a–48n. Pulse stretcher 88, which is optional, comprises circuitry which lengthens pulses as described above for pulse stretcher 76. Correlator 82 in clock recovery 50 compares and matches pulses sampled by sampler 78 to known synchronization symbols as described above to determine the location of the data header codes 48a–48n in the pulse stream. Data header predictor 92 comprises circuitry which generates mask signals, according to the predicted locations of the data header codes 48a–48n, and provides mask signals to mask element 86 to suppress pulses which are not associated with data header codes 48a–48n. Mask signals are negated prior to detection of data header codes 48a, 48n.

Offset detector circuit 90 comprises circuitry and digital logic which oversamples the incoming pulse stream and uses the location of the data header codes 48a–48n in the pulse stream, together with the timing information from PLL 80, to determine phase offsets for each data slot 44a–44n. In the presently preferred embodiment, the training sequence of the data header codes 48a–48n comprises "01111", and an average delay offset for each the "ones" is determined digitally, using oversampling with a counter (not shown) by offset detector 90, to determine a phase offset according to the Master Sync codes 46 and data header codes 48a–48n.

The data processing or recovery function 54 uses the phase locked clock information from PLL 80 of clock recovery function 50, and the phase offsets determined by phase offset detector 52, to sample the incoming pulse stream at the appropriate, phase offset corrected times, and provide a digital value for each incoming symbol in the pulse stream. A digitally controlled delay circuit or sampling timer circuit 94 is operatively coupled to PLL 80 in clock recovery function 50 and to offset detector 90 in phase offset detector 52. An analog-to digital converter (ADC) 96 is operatively coupled to digitally controlled delay device 94 and to amplifier 70 of pulse detector 20. A decoder circuit 98 is operatively coupled to ADC 96 and to DLL interface 36 (FIG. 2). The phase locked clock output from PLL 80 and phase offset output from offset detector 90 are provided to delay circuit 94 which determines sample timing. ADC 96 carries out sampling of incoming analog output from pulse detector 20 according to the timing provided by delay circuit 94. Decoder 98 comprises circuitry which takes values from ADC 96 and converts the values to symbols. In the case of on-off keying, the presence or absence of a pulse at the sampled time corresponds to a digital "one" or "zero", as related above. For on-off-keying modulation, ADC 96 may be a one-bit ADC, or alternatively, a comparator circuit. In the case of pulse amplitude modulation, decoder 98 utilizes quantization levels to determine the output value per measured voltage level. In one embodiment wherein pulse amplitude modulation is used, eight voltage levels are used to produce a three-bit value.

Where on-off-keying modulation is used, data recovery function 54 can utilize pulse detection output from voltage comparator 72. In this case, a mask element and pulse prediction circuit (not shown) may be used for data sampling, with mask signals generated to allow pulses to reach ADC 96 at appropriate sampling times according to the output from PLL 80 and offset detector 90. If a pulse occurs in the sampling window, a "one" is detected, and if no pulse occurs in the sampling window, a "zero" is detected.

Referring to FIG. 6, as well as FIG. 1 through FIG. 5, the operation of the invention is carried out as follows. At event 100, transmitted RF pulses are converted to corresponding voltage pulses which define generally a pulse stream. the receiver front end 18 receives a stream of short RF pulses which are arranged according to TDMA framing, with a Master Sync Code 46 occurring once per data frame 38, and a data header code 44a–44n occurring once per data slot. The RF pulses are converted in the front end 18 to a stream of filtered, amplified voltage pulses.

At event 110, the pulse detector 20 detects the pulses in the pulse stream from the front end 18 using a tunnel diode or Schottky diode 64 to rectify the pulse stream to DC voltage pulses and provide a power envelope, and a threshold voltage comparator 72 to remove pulses which fall beneath a predetermined voltage threshold. High pass filter 68 removes unwanted DC offset and related interference.

At event 120, detected pulses are sampled by the clock recovery function. The clock recovery function 50, while initially searching for pulses from detector 20, will negate the mask element 74 so that all detected pulses are directed to the pulse stretcher 76 and pulse sampler 78. The pulses are sampled by digital logic in the sampler 78 and passed to the correlator 82.

At event 130, a sync code match is sought. Correlator 82 compares the incoming pulse stream to a known Master Sync Code pattern 46 until a match is found. Multiple correlators may be used in parallel, as noted above. When a sync code match is found, the location of the Master Sync Code 46 in the pulse stream is communicated to the sync code predictor 84. If a sync code match is not found, pulse sampling 120 is repeated.

At event 140, pulses which are unrelated to predicted sync codes are masked or suppressed. Sync code predictor 84 predicts the location, in the pulse stream, of subsequent Master Sync Code sequences 46. The sync code predictor 84 then generates mask signals for the mask element 74 to suppress or mask out pulses except where a valid bit of a synchronization symbol is expected.

At event 150, the local clock of the receiver apparatus 16 is matched to the master clock via the Master Sync Codes 46. Where the sync code predictor 84 has predicted an incoming Master Sync Code 46 in the pulse stream, the PLL 80 compares the rising edge of its internal bit clock to the incoming pulses of the Master Sync Code 46, and adjusts or matches the phase of the PLL bit clock to the phase of the incoming pulses. The phase adjustment uses a first, coarse synchronization wherein the period of the PLL bit clock is roughly matched in phase to the incoming pulses, and a second, finer synchronization wherein a VCO circuit adjusts the bit clock rising edge according to the measured phase difference or offset.

At event 160, phase offset detector 52 samples pulses from pulse detector 20 for data header codes 48a–48n in order to generate phase offset corrections according to timing information from PLL 80 and clock recovery function 50.

At event 170, a data header match is sought by data header predictor 92. Data header predictor 92 utilizes the master sync code identified by correlator 82 to predict the location of data header codes 48a–48n in the pulse stream. If a data header code location is not predicted, pulse sampling 160 is repeated.

At event 180, pulses unrelated to data header codes are selectively masked. Data header predictor 92 generates mask signals for mask element 86 to suppress pulses which are not associated with predicted data header codes 48a–48n.

At event 190, phase offset corrections are made. Unmasked pulses from mask element 86 are dilated by pulse stretcher 88 and sampled by digital logic in offset detector 90, which determines a phase offset value for the data header code 48a–48n (and corresponding data slot 44a–44n) according to the timing output of PLL 80.

At event 200, sampling timing is adjusted. Sampling timer circuit 94 in data recovery function 54 utilizes the master clock phase offset information from clock recovery function 50, with the phase offset values determined by phase offset detector 52, to determine phase corrected sampling times for the pulse stream from pulse detector 20.

At event 210, timed data sampling is carried out. ADC 96 samples the pulse stream at the appropriate sampling times according to master clock timing and phase offset information determined as related above. Decoding then occurs at event 220, where decoder 98 converts sampled values to digital symbols. The output from decoder 98 is directed to DLL interface 36 (FIG. 2), for use in higher protocol layers of the network 10.

Accordingly, it will be seen that this invention provides a base band receiver apparatus and method which can receive data in the form of short, spread spectrum pulses, which can be used with a network of transceiver node devices, which is not susceptible to multipath fading or interference with narrow band communication systems, which can be used for indoor applications, and which is relatively simple and inexpensive to implement. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A base band receiver apparatus, comprising:
   (a) an RF front end;
   (b) a pulse detector, said pulse detector operatively coupled to said RF front end; and
   (c) a data processing function, said data processing function operatively coupled to said pulse detector, said data processing function including a clock recovery function, a phase offset detector, and a data recovery function, said clock recovery function configured to recover a master clock timing information from said pulse detector.

2. The base band receiver apparatus of claim 1, wherein said pulse detector comprises an envelope detector circuit.

3. The base band receiver apparatus of claim 2, wherein said envelope detector circuit comprises a tunnel diode.

4. The base band receiver apparatus of claim 2, wherein said envelope detector circuit comprises a Schottky diode.

5. The base band receiver apparatus of claim 4, wherein said envelope detector circuit further comprises a high pass filter, said Schottky diode serially interfaced to said RF front end and said high pass filter, said Schottky diode having an anode end operatively coupled to said RF front end, said Schottky diode having a cathode end operatively coupled to said high pass filter.

6. The base band receiver apparatus of claim 3, wherein said envelope detector circuit further comprises a high pass filter, said tunnel diode serially interfaced to said RF front end and said high pass filter, said tunnel diode having an anode end operatively coupled to said RF front end, said tunnel diode having a cathode end operatively coupled to said high pass filter.

7. The base band receiver apparatus of claim 1, wherein said RF front end comprises:

(a) an antenna;

(b) at least one RF filter, said RF filter operatively coupled to said antenna; and (c) at least one RF amplifier, said RF amplifier operatively coupled to said RF filter.

8. The base band receiver apparatus of claim 2, wherein said envelope detector circuit comprises:

(a) a tunnel diode, said tunnel diode operatively coupled to said RF front end; and (b) a voltage comparator, said voltage comparator operatively coupled to said tunnel diode, said voltage comparator operatively coupled to said data processing function.

9. The base band receiver apparatus of claim 2, wherein said envelope detector circuit comprises:

(a) a Schottky diode, said Schottky diode operatively coupled to said RF front end; and (b) a voltage comparator, said voltage comparator operatively coupled to said Schottky diode, said voltage comparator operatively coupled to said data processing function.

10. The base band receiver apparatus of claim 8, wherein said envelope detector circuit comprises a high pass filter, said tunnel diode operatively coupled to said high pass filter.

11. The base band receiver apparatus of claim 9, wherein said envelope detector circuit comprises a high pass filter, said Schottky diode operatively coupled to said high pass filter.

12. The base band receiver apparatus of claim 8, wherein said envelope detector circuit further comprises:

(a) a first amplifier, said first amplifier operatively coupled to said tunnel diode, said first amplifier operatively coupled to said RF front end; and (b) a second amplifier, said second amplifier operatively coupled to said high pass filter, said second amplifier operatively coupled to said voltage comparator.

13. The base band receiver apparatus of claim 9, wherein said envelope detector circuit further comprises:

(a) a first amplifier, said first amplifier operatively coupled to said Schottky diode, said first amplifier operatively coupled to said RF front end; and (b) a second amplifier, said second amplifier operatively coupled to said high pass filter, said second amplifier operatively coupled to said voltage comparator.

14. A base band receiver apparatus, comprising:

(a) a front end section, said front end section including an antenna configured to receive short pulse RF signals and convert said RF pulse signals into a voltage pulse stream;

(b) a detector diode envelope detector, said detector diode envelope detector operatively coupled to said front end section, said detector diode envelope detector configured to detect pulses in said voltage pulse stream; and (c) a data processing section, said data processing section operatively coupled to said detector diode envelope detector, said data processing section configured to recover timing information from said detected pulses, said data processing section configured to recover phase offset information from said detected pulses according to said timing information, said data processing function configured to recover data from said detected pulses according to said timing information and said phase offset information, said timing information including a master sync code for each data frame of said detected pulses.

15. The base band receiver apparatus of claim 14, wherein said front end section further comprises at least one frequency selective filter and at least one amplifier, said frequency selective filter and said amplifier operatively coupled to said antenna.

16. The base band receiver apparatus of claim 14, wherein said detector diode envelope detector comprises a tunnel diode operatively coupled to said front end section, and a voltage comparator operatively coupled to said tunnel diode.

17. The base band receiver apparatus of claim 16, wherein said detector diode envelope detector further comprises a high pass filter, said high pass filter operatively coupled to said tunnel diode and said voltage comparator.

18. The base band receiver apparatus of claim 14, wherein said detector diode envelope detector comprises a Schottky diode operatively coupled to said front end section, and a voltage comparator operatively coupled to said Schottky diode.

19. The base band receiver apparatus of claim 18, wherein said detector diode envelope detector further comprises a high pass filter, said high pass filter operatively coupled to said Schottky diode and said voltage comparator.

20. A base band spread spectrum receiver apparatus, comprising:

(a) a front end section;

(b) a pulse envelope detector for detecting pulses received at said front end section, said pulse envelope detector operatively coupled to said front end, said pulse envelope detector including a detector diode and a high pass filter, said detector diode serially interfaced to said front end and said high pass filter, said detector diode having an anode end operatively coupled to said front end section, said detector diode having a cathode end operatively coupled to said high pass filter; and (c) a data recovery function, said data recovery function operatively coupled to said pulse envelope detector configured to recover a master clock timing information including a master sync code for each data frame of detected pulses from said pulse envelope detector.

21. The base band spread spectrum receiver apparatus of claim 20, wherein said pulse envelope detector further comprises a voltage comparator, said voltage comparator operatively coupled to said high pass filter and said data recovery function.

22. The base band receiver apparatus of claim 20, wherein said front end section further comprises at least one frequency selective filter and at least one amplifier, said frequency selective filter and said amplifier operatively coupled to said antenna.

23. The base band receiver apparatus of claim 20, wherein said detector diode comprises a tunnel diode.

24. The base band receiver apparatus of claim 20, wherein said detector diode comprises a Schottky diode.

25. A method for receiving base band signals, comprising:

(a) converting an RF pulse stream into a voltage pulse stream;

(b) detecting pulses in said pulse stream with a detector diode pulse envelope detector, said detected pulses including master clock timing information;

(c) recovering said master clock timing information from said detected pulses;

(d) determining phase offset corrections from said detected pulses according to said master clock timing information; and (e) recovering data from said detected pulses according to said master clock timing information and said phase offset corrections.

26. The method of claim 25, further comprising masking selected ones of said detected pulses when said selected detected pulses are predicted to be unassociated with said master clock timing information.

27. The method of claim 25, further comprising masking selected ones of said detected pulses, said selected detected pulses being unassociated with said phase offset information.

28. The method of claim 25, further comprising stretching said detected pulses.

29. A base band receiver apparatus, comprising:
(a) an RF front end;
b) a pulse detector, said pulse detector operatively coupled to said RF front end; and
(c) a data processing function, said data processing function operatively coupled to said pulse detector, said data processing function including a clock recovery function, a phase offset detector, and a data recovery function;
wherein said clock recovery function comprises:
(a) a pulse sampler, said pulse sampler operatively coupled to said pulse detector;
b) at least one correlator, said correlator operatively coupled to said pulse sampler;
(c) a phase lock element, said lock element operatively coupled to said pulse detector; and
(d) a sync predictor, said sync predictor operatively coupled to said correlator.

30. The apparatus of claim 29, wherein said clock recovery function further comprises a mask element, said mask element operatively coupled to said pulse detector, said mask element operatively coupled to sync predictor, said mask element operatively coupled to pulse sampler.

31. The apparatus of claim 30, wherein said clock recovery function further comprises a pulse stretcher, said pulse stretcher operatively coupled to said mask element, said pulse stretcher operatively coupled to said phase lock element, said pulse stretcher operatively coupled to said pulse sampler.

32. The apparatus of claim 29, wherein said phase offset detector comprises:
(a) an offset detector, said offset detector operatively coupled to said phase lock element, said offset detector operatively coupled to said pulse detector; and
(b) a data header predictor, said data header predictor operatively coupled to said correlator, said data header predictor operatively coupled to said offset detector.

33. The apparatus of claim 32, wherein said phase offset detector farther comprises a mask element, said mask element operatively coupled to said offset detector, said mask element operatively coupled to said data header predictor, said mask element operatively coupled to said pulse detector.

34. The apparatus of claim 33, wherein said phase offset detector further comprises a pulse stretcher, said pulse stretcher operatively coupled to said mask element, said pulse stretcher operatively coupled to said offset detector.

35. The apparatus of claim 32, wherein said data processing function comprises:
(a) a digitally controlled delay circuit, said digitally controlled delay circuit operatively coupled to said phase lock element and said offset detector;
(b) an analog-to-digital converter, said analog-to-digital converter operatively coupled to said digitally controlled delay circuit, said analog-to-digital converter operatively coupled to said pulse detector; and
(c) a decoder, said decoder operatively coupled to said analog-to-digital converter.

36. The apparatus of claim 29 wherein said pulse detector comprises an envelope detector circuit.

37. The apparatus of claim 36 wherein said envelope detector circuit comprises a tunnel diode.

38. The apparatus of claim 37 wherein said envelope detector circuit further comprises a high pass filter, said Schottky diode serially interfaced to said RF front end and said high pass filter, said Schottly diode having an anode end operatively coupled to said RF front end, said Schottky diode having a cathode end operatively coupled to said high pass filter.

39. The apparatus of claim 36 wherein said envelope detector circuit comprises a Schottky diode.

40. The apparatus of claim 39 wherein said envelope detector circuit further comprises a high pass filter, said Schottky diode serially interfaced to said RF front end and said high pass filter, said Schottky diode having an anode end operatively coupled to said RF front end, said Schottky diode having a cathode end operatively coupled to said high pass filter.

41. The apparatus of claim 36 wherein said envelope detector circuit comprises:
(a) a tunnel diode, said tunnel diode operatively coupled to said RF front end; and
(b) a voltage comparator, said voltage comparator operatively coupled to said tunnel diode, said voltage comparator operatively coupled to said data processing function.

42. The apparatus of claim 41 wherein said envelope detector circuit comprises a high pass filter, sand tunnel diode operatively coupled to said high pass filter.

43. The apparatus of claim 41 wherein said envelope detector circuit further comprises:
(a) a first amplifier, said first amplifier operatively coupled to said tunnel diode, said first amplifier operatively coupled to said RF front end; and
(b) a second amplifier, said second amplifier operatively coupled to said high pass filter, said second amplifier operatively coupled to said voltage comparator.

44. The apparatus of claim 36 wherein said envelope detector circuit comprises:
(a) a Schottky diode, said Schottky diode operatively coupled to said RF front end; and
(b) a voltage comparator, said voltage comparator operatively coupled to said Schottky diode, said voltage comparator operatively coupled to said data processing function.

45. The apparatus of claim 44 wherein said envelope detector circuit comprises a high pass filter, said Schottky diode operatively coupled to said high pass filter.

46. The apparatus of claim 44 wherein said envelope detector circuit comprises:
(a) a first amplifier, said first amplifier operatively coupled to said Schottky diode, said first amplifier operatively coupled to said RF front end; and
(b) a second amplifier, said second amplifier operatively coupled to said high pass filter, said second amplifier operatively coupled to said voltage comparator.

47. The apparatus of claim 29 wherein said RF front end comprises:
(a) an antenna;
(b) at least one RF filter, said RF filter operatively coupled to said antenna; and (c) at least one RF amplifier, said RF amplifier operatively coupled to said RF filter.

48. A base band receiver apparatus, comprising:
(a) a front end section, said front end section including an antenna configured to receive short pulse RF signals and convert said RF pulse signals into a voltage pulse stream;
(b) a detector diode envelope detector, said detector diode envelope detector operatively coupled to said front end section, said detector diode envelope detector configured to detect pulses in said voltage pulse stream; and
(c) a data processing section, said data processing section operatively coupled to said detector diode envelope detector, said data processing section configured to recover timing information from said detected pulses, said data processing section configured to recover phase offset information from said detected pulses according to said timing information, said data processing function configured to recover data from said detected pulses according to said timing information and said phase offset information;
wherein said data processing section comprises a clock recovery function, said clock recovery function comprising:
(a) a pulse sampler, said pulse sampler operatively coupled to said detector diode envelope detector, said pulse sampler configured to sample said detected pulses;
(b) at least one correlator operatively coupled to said pulse sampler, said correlator configured to match said detected pulses with a predetermined pattern representative of a synchronization symbol;
(c) a phase lock element operatively coupled to said detector diode envelope detector; and
(d) a sync predictor, said sync predictor operatively coupled to said correlator.

49. The apparatus of claim 48, wherein said clock recovery function further comprises a pulse suppressor, said pulse suppressor operatively coupled to said sync predictor, said pulse suppressor operatively coupled to said pulse sampler, sand pulse suppressor operatively coupled to said phase lock element, said pulse suppressor operatively coupled to said voltage comparator.

50. The apparatus of claim 49, wherein said clock recovery function further comprises a pulse stretcher, said pulse stretcher operatively coupled to a mask element, said pulse stretcher operatively coupled to said pulse sampler, said pulse stretcher operatively coupled to said phase lock element.

51. The apparatus of claim 48 wherein said data processing section further comprises a phase offset detector, said phase offset detector comprising:
(a) an offset detector, said offset detector operatively coupled to said phase lock element, said offset detector operatively coupled to said detector diode envelope detector; and
(b) a data header predictor, said data header predictor operatively coupled to said correlator, said data header predictor operatively coupled to said offset detector.

52. The apparatus of claim 51 wherein said phase offset detector further comprises a pulse suppressor, said pulse suppressor operatively coupled to said offset detector, said pulse suppressor operatively coupled to said data header predictor, said pulse suppressor operatively coupled to said detector diode envelope detector.

53. The apparatus of claim 52 wherein said phase offset detector further comprises a pulse stretcher, said pulse stretcher operatively coupled to said pulse suppressor, said pulse stretcher operatively coupled to said offset detector.

54. The apparatus of claim 51 wherein said data processing section further comprises a data detector, said data detector comprising:
(a) a digital sampling timer circuit, said digital sampling timer circuit operatively coupled to said phase lock element, said digital sampling timer circuit operatively coupled to said offset detector;
(b) an analog-to-digital converter, said analog-to-digital converter operatively coupled to said digital sampling timer circuit, said analog-to-digital converter operatively coupled to said tunnel diode detector; and
(c) a decoder, said decoder operatively coupled to said analog-to-digital converter.

55. The apparatus of claim 48 wherein said front end section further comprises at least one frequency selective filter and at least one amplifier, said frequency selective filter and said amplifier operatively coupled to said antenna.

56. The apparatus of claim 48 wherein said detector diode envelope detector comprises a tunnel diode operatively coupled to said front end section, and a voltage comparator operatively coupled to said tunnel diode.

57. The apparatus of claim 56 wherein said detector diode envelope detector further comprises a high pass filter, said high pass filter operatively coupled to said tunnel diode and said voltage comparator.

58. The apparatus of claim 48 wherein said detector diode envelope detector comprises a Schottky diode operatively coupled to said front end section, and a voltage comparator operatively coupled to said Schottky diode.

59. The apparatus of claim 58 wherein said detector diode envelope detector further comprises a high pass filter, said high pass filter operatively coupled to said Schottky diode and said voltage comparator.

60. A base band spread spectrum receiver apparatus, comprising:
(a) a front end section;
(b) a pulse envelope detector, said pulse envelope detector operatively coupled to said front end, said pulse envelope detector including a detector diode and a high pass filter, said detector diode serially interfaced to said front end and said high pass filter, said detector diode having an anode end operatively coupled to said front end section, said detector diode having a cathode end operatively coupled to said high pass fitter; and
(c) a data recovery function, said data recovery function operatively coupled to said pulse envelope detector;
wherein said data recovery function comprises a clock recovery function, said clock recovery function comprising:
(a) a pulse sampler, said pulse sampler operatively coupled to said pulse envelope detector, said pulse sampler configured to sample said detected pulses;
(b) at least one correlator operatively coupled to said pulse sample, said correlator configured to match said detected pulses with a predetermined pattern representative of a synchronization symbol;
(c) a phase lock element operatively coupled to said pulse envelope detector; and
(d) a sync predictor, said sync predictor operatively coupled to said correlator.

61. The apparatus of claim 60 wherein said clock recovery function further comprises a mask element, said mask element operatively coupled to said sync predictor, said mask element operatively coupled to said pulse sampler, said mask element operatively coupled to said phase lock element, said mask element operatively coupled to said pulse envelope detector.

62. The apparatus of claim 61 wherein said clock recovery function further comprises a pulse stretcher, said pulse stretcher operatively coupled to said mask element, said pulse stretcher operatively coupled to said pulse sampler, said pulse stretcher operatively coupled to said phase lock element.

63. The apparatus of claim 60 wherein said data recovery section further comprises a phase offset detector, said phase offset detector comprising:
   (a) an offset detector, said offset detector operatively coupled to said phase lock element, said offset detector operatively coupled to said pulse envelope detector; and
   (b) a data header predictor, said data header predictor operatively coupled to said correlator, said data header predictor operatively coupled to said offset detector.

64. The apparatus of claim 63 wherein said phase offset detector further comprises a mask element, said mask element operatively coupled to said offset detector, mask element operatively coupled to said data header predictor, said mask element operatively coupled to said pulse envelope detector.

65. The apparatus of claim 64 wherein said phase offset detector further comprises a pulse stretcher, said pulse stretcher operatively coupled to said mask element, said pulse stretcher operatively coupled to said offset detector.

66. The apparatus of claim 63 wherein said data recovery section further comprises a data detector, said data detector comprising:
   (a) a digital sampling timer circuit, said digital sampling timer circuit operatively coupled to said phase lock element, said digital sampling timer circuit operatively coupled to said offset detector;
   (b) an analog-to-digital converter, said analog-to-digital converter operatively coupled to said digital sampling timer circuit said analog-to-digital converter operatively coupled to said pulse envelope detector; and
   (c) a decoder, said decoder operatively coupled to said analog-to-digital converter.

67. The apparatus of claim 60 wherein said pulse envelope detector further comprises a voltage comparator, said voltage comparator operatively coupled to said high pass filter and said data recovery function.

68. The apparatus of claim 60 wherein said front end section comprises at least one frequency selective filter and at least one amplifier, said frequency selective filter and said amplifier operatively coupled to said antenna.

69. The apparatus of claim 60 wherein said detector diode comprises a tunnel diode.

70. The apparatus of claim 60 wherein said detector diode comprises a Schottky diode.

* * * * *